US012790818B1

(12) United States Patent
Davis et al.

(10) Patent No.: US 12,790,818 B1
(45) Date of Patent: Nov. 10, 2026

(54) WATER-RESISTANT WALLBOARD

(71) Applicant: DDP SPECIALTY ELECTRONICS MATERIALS US, LLC, Wilmington, DE (US)

(72) Inventors: Jarrett B. Davis, Salisbury, NC (US); Francis Mike Cretella, Salisbury, NC (US); M. Steven Doggett, Salisbury, NC (US); Adam Broderick, Midland, MI (US); Yiyong He, Midland, MI (US); Mark Rickard, Midland, MI (US)

(73) Assignee: DDP SPECIALTY ELECTRONICS MATERIALS US, LLC, Wilmington, DE (US)

( * ) Notice: Subject to any disclaimer, the term of this patent is extended or adjusted under 35 U.S.C. 154(b) by 262 days.

(21) Appl. No.: 18/325,549

(22) Filed: May 30, 2023

Related U.S. Application Data

(60) Provisional application No. 63/504,294, filed on May 25, 2023, provisional application No. 63/347,259, filed on May 31, 2022.

(51) Int. Cl.
*E04B 1/64* (2006.01)
*C09D 7/61* (2018.01)
*C09D 135/06* (2006.01)
*C09D 143/04* (2006.01)

(52) U.S. Cl.
CPC ................ *E04B 1/644* (2013.01); *C09D 7/61* (2018.01); *C09D 135/06* (2013.01); *C09D 143/04* (2013.01)

(58) Field of Classification Search
CPC ......... E04B 1/644; C09D 7/61; C09D 135/06; C09D 143/04
See application file for complete search history.

(56) References Cited

U.S. PATENT DOCUMENTS

| | | | | |
|---|---|---|---|---|
| 9,353,523 | B2 | 5/2016 | Taylor, Jr. et al. | |
| 9,957,722 | B2 | 5/2018 | Taylor, Jr. et al. | |
| 9,963,885 | B2 | 5/2018 | Taylor, Jr. et al. | |
| 10,415,256 | B2 | 9/2019 | Taylor, Jr. et al. | |
| 10,858,842 | B2 | 12/2020 | Taylor, Jr. et al. | |
| 10,858,843 | B2 | 12/2020 | Taylor, Jr. et al. | |
| 11,313,134 | B2 | 4/2022 | Taylor, Jr. et al. | |
| 11,725,393 | B2 * | 8/2023 | Taylor, Jr. | B32B 13/02 52/309.9 |
| 2016/0312048 | A1 * | 10/2016 | Tsukigase | C09D 133/00 |
| 2017/0037639 | A1 * | 2/2017 | Taylor, Jr. | B32B 13/12 |
| 2018/0291232 | A1 * | 10/2018 | Kashiwakura | B05D 1/40 |
| 2019/0390044 | A1 * | 12/2019 | Rashid | C08L 13/02 |
| 2021/0179886 | A1 * | 6/2021 | He | C09D 175/08 |
| 2021/0324231 | A1 * | 10/2021 | He | C08G 18/5024 |

* cited by examiner

*Primary Examiner* — Travis M Figg
(74) *Attorney, Agent, or Firm* — Shumaker, Loop & Kendrick, LLP; S. Alexander Long, Jr.

(57) ABSTRACT

A water-resistant wallboard, or wall panel, is disclosed. The water-resistant wallboard includes a composite cementitious layer and water-resistant coating on a surface of the composite cementitious layer. The water-resistant wallboard may further include an insulating layer. The water-resistant coating may include a base polymer having a glass transition temperature of less than 20° C., providing for a coating with increased adhesion of the water-resistant coating in both wet and dry conditions.

20 Claims, 2 Drawing Sheets

WATER-RESISTANT WALLBOARD

FIELD

The present disclosure relates generally to the field of building construction materials. More specifically, the present disclosure relates to the field of water-resistant components for the construction of walls, ceilings, and other surfaces.

BACKGROUND OF THE INVENTION

The International Building Code and the International Residential Code both require the use of barriers to protect the building from air and water penetration. One method of protecting wall boards from water intrusion and create a water barrier enclosure is by coating the board with a water-resistant barrier (WRB) coating; and if further desired, sealing the gaps between the boards with a sealant.

Magnesium oxide (MgO) wallboards/wall-panels can be used as exterior sheathing; as they provide effective fire barrier, a structural element to hold cladding, and thermal barriers. Magnesium oxide boards are a cement-type board, which can be difficult to coat. A number of commercial fluid-applied WRB products are available to apply to create a water barrier on the exterior of buildings. Most do not maintain good adhesion to MgO, particularly if the coated board gets wet after installed in a wall or building. As such, the present disclosure addresses the above problems by providing a water-resistant barrier coating that efficiently maintains its adherence to cement-type boards, such as MgO wallboards, in both wet and dry conditions.

BRIEF SUMMARY

In one aspect, a water-resistant wall panel is described herein. The water-resistant wall panel comprising a composite cementitious layer and a water-resistant coating on the composite cementitious layer. The water-resistant coating comprises a base polymer with a glass transition temperature less than 20° C.

In another aspect, the water-resistant wall panel comprises a composite cementitious layer, an insulating layer, and a water-resistant coating on the composite cementitious layer. The water-resistant coating comprises a base polymer with a glass transition temperature less than 20° C.

In some embodiments, the composite cementitious layer comprises magnesium oxide (MgO).

In some embodiments, the water-resistant wall panel has increased vapor permeability in an increasingly humid environment. In some embodiments, the water-resistant coating has a greater vapor permeability than the insulating layer.

In some embodiments, the base polymer of the water-resistant coating has a glass transition temperature less than 10° C. In some embodiments, the base polymer of the coating composition comprises an acrylate monomer. Additionally, or alternatively, the base polymer of the coating composition comprises a styrene monomer.

In some embodiments, the water-resistant coating further comprises a phosphate additive. In some embodiments, the phosphate additive is TKPP. In some embodiments, the phosphate additive is TSPP. In some embodiments, the phosphate additive is a phosphate-containing polymer. In some embodiments, the phosphate-containing polymer comprises 2-(methacryloyloxy) ethyl phosphonic acid or MEP. Additionally, or alternatively, the phosphate-containing polymer comprises phosphoethyl methacrylate or PEM. In some embodiments, the phosphate-containing polymer comprises a polymer of Formula I, wherein R is an alkyl group.

(Formula I)

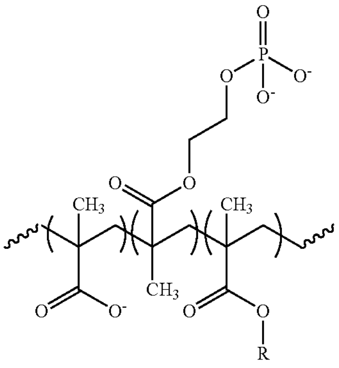

In some embodiments, the water-resistant coating has a pull-off adhesion strength to the composite cementitious board of greater than 50 psi, when tested in wet conditions. Additionally, or alternatively, the water-resistant coating has a pull-off adhesion strength to the composite cementitious board of greater than 80, when tested in dry conditions.

In some embodiments, the water-resistant coating further comprises a high-coalescing solvent to further regulate the glass transition temperature of the water-resistant coating.

In another aspect, a method for manufacturing a water-resistant wall panel is described herein. The method comprises coating a first surface of a composite cementitious layer with a water-resistant coating as described in the first aspect and drying or curing the water-resistant coating. In some embodiments, the method further comprises forming the composite cementitious layer. In some embodiments, forming the composite cementitious layer comprises pouring, into a mold, a slurry of uncured cementitious product, and curing the slurry to obtain a cured composite layer. In some embodiments, the method further comprises applying an insulating later to a second surface of the composite cementitious layer. In some embodiments, the water-resistant coating is dried at ambient conditions (i.e., 24° C., 50% RH), where the glass transition temperature of the base polymer is less than 20° C. Alternatively, the water-resistant coating is dried, in some embodiments, for twenty-four hours, preferably at a temperature greater than the glass transition temperature of the base polymer of the coating composition.

In another aspect, a water-resistant wall panel is described. The water-resistant wall panel comprising a composite cementitious layer comprises magnesium oxide and glass fiber reinforcing material, and a water-resistant coating on the composite cementitious layer. The water-resistant coating comprises a base polymer wherein the base polymer has a glass transition temperature less than 20° C.

In another aspect, a water-resistant wall panel is described. The water-resistant wall panel comprising a composite cementitious layer comprises magnesium oxide and glass fiber reinforcing material, an insulation layer, and a water-resistant coating on the composite cementitious layer. The water-resistant coating comprises a base polymer wherein the base polymer has a glass transition temperature less than 20° C.

In another aspect, a water-resistant wall panel is described comprising a composite layer, and a water-resistant coating on the composite cementitious layer. The water-resistant coating comprises a base polymer, where the base polymer has a glass transition temperature of 23° C. or lower, and wherein the water-resistant coating further comprises a phosphate additive. In some embodiments, the water-resistant wall panel further comprises an insulation layer. In some embodiments, the phosphate additive is TKPP. In some embodiments, the phosphate additive is TSPP. In some embodiments, the phosphate additive is a phosphate-containing polymer. In some embodiments, the phosphate-containing polymer comprises 2-(methacryloyloxy)ethyl phosphonic acid or MEP. Additionally, or alternatively, the phosphate-containing polymer comprises phosphoethyl methacrylate or PEM. In some embodiments, the phosphate-containing polymer comprises a polymer of Formula I, wherein R is an alkyl group.

(Formula I)

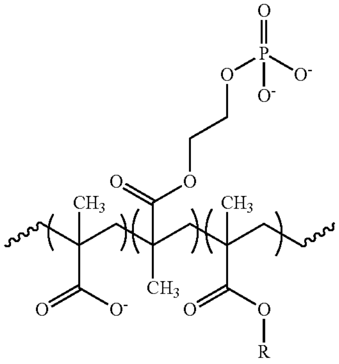

BRIEF DESCRIPTION OF THE DRAWINGS

The drawings described herein are for illustrative purposes for selected embodiments and not all possible implementations and are not intended to limit the scope of the present disclosure.

DETAILED DESCRIPTION OF EMBODIMENTS OF THE INVENTION

Figure 1:
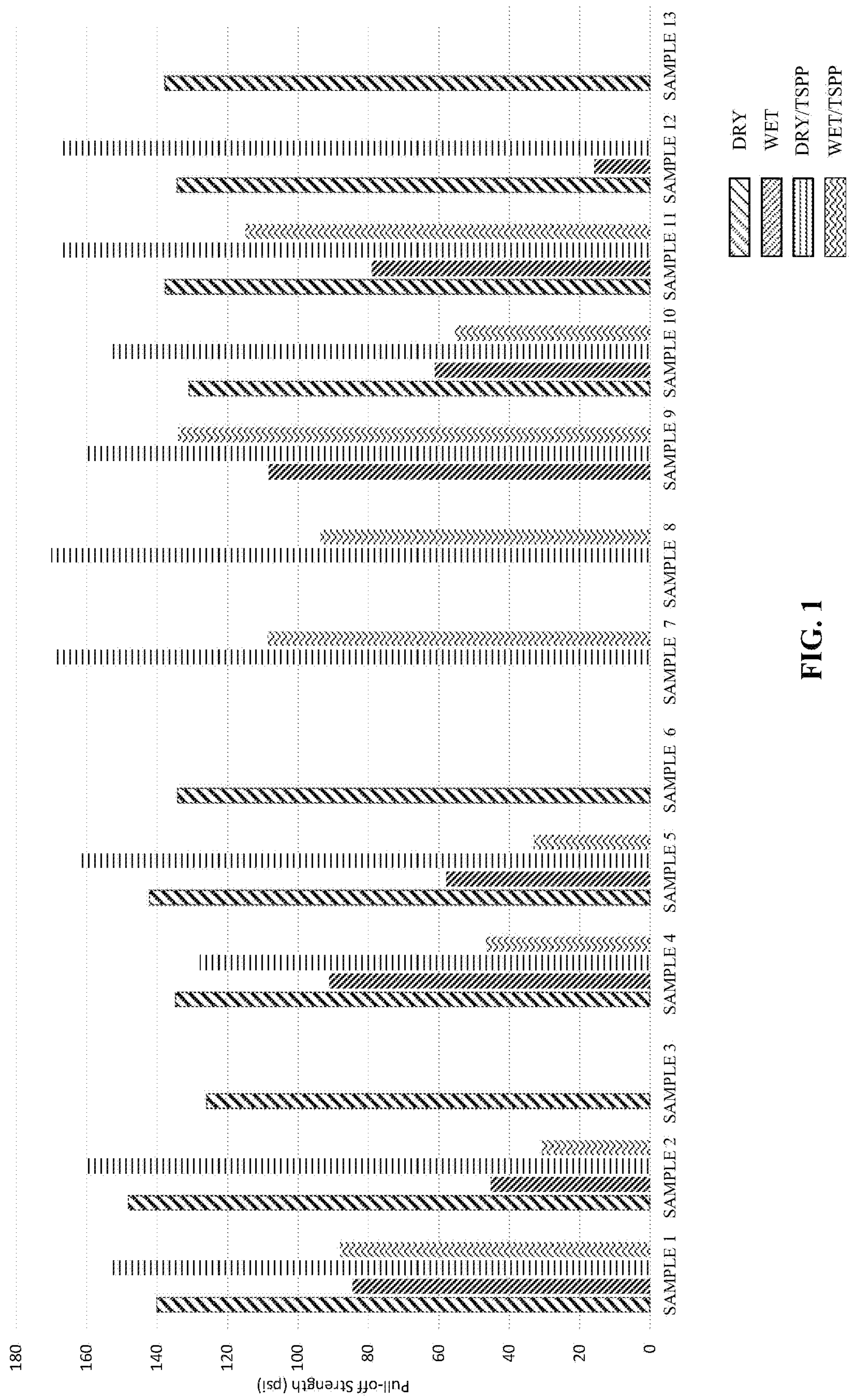
FIG. 1 is a chart representing the adhesion properties of some representative coatings, in accordance with an embodiment of the present invention.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention. It must be noted that, as used in the specification and the appended claims, the singular forms "a," "an" and "the" include plural referents unless the context clearly dictates otherwise.

The wall panel described herein is a wallboard or wall panel used as structural insulated sheathing (SIS). The panels are comprised a composite cementitious layer. In some embodiments, the panel further comprises an insulation layer. The composite cementitious layer may contain a cementitious material, magnesium oxide, or mixtures thereof. "Magnesium oxide" as used herein is meant to include magnesium oxychloride or magnesium oxysulphate or magnesium oxyphosphate or combinations thereof, which can optionally include fillers (such as perlite, etc.) and other additives such as water resistance and processing additives. "Cementitious material" is meant to include materials containing magnesium oxide as defined herein, or other cement types, such as Portland cement; or any mixtures thereof of these materials.

In some embodiments, composite layer may be made from a slurry of uncured cementitious material, such as magnesium oxide (MgO), with a glass fiber reinforcing material preferably embedded therein. The glass fiber has high strength and is preferably the principal load carrying member of the composite cementitious layer and wall panel, the cement forming a matrix that allows the fibers to substantially retain their location and orientation. Preferably, the glass fiber reinforcing material is a glass fiber mesh or web or woven scrim, as desired. The slurry may be poured into a mold and cured or dried. Once cured, the panel will be removed from the mold. In some embodiments, the insulating layer will be applied to one surface of the panel. In some embodiments, there may be a second composite cementitious layer on a second side of the insulating layer. The insulating layer may be a rigid pour foam, or a rigid injected foam, formed from a two-part Class I rated urethane. An exemplary composite cementitious layer is described in U.S. patent application Ser. No. 17/350,333. The insulating layer can be between one inch and three inches thick or greater depending on the application. In some embodiments, the insulating layer is two inches thick. In some embodiments, the insulating layer comprises polyurethane or polyester. In some embodiments, the insulating layer may comprise polystyrene. Examples of polystyrene insulation include expanded polystyrene foam and extruded polystyrene foam. Additionally, or alternatively, the insulating layer may comprise a polyisocyanurate, polyurea, phenolic foam or an organic aerogel. In some embodiments, the insulating layer may comprise an inorganic insulating material, such as mineral wool, glass wool, compressed fumed silica, perlite, calcium silicate, foamed glass or silica aerogel blanket. In some embodiments, the insulating layer can be a machined, pre-made foam containing slots of a suitable size for surrounding and affixing the reinforcement structures to the outer layer. In some embodiments, the insulating layer may comprise mineral wool.

The composite cementitious layer may be about 0.25 inch to about 1.5 inch thick. In some embodiments composite cementitious layer is about 0.5 inch thick. The insulating layer may be between one inch and three inches thick or greater depending on the application.

The water-resistant coating may be prepared using a typical two-step grind and letdown process. The grind ingredients are mixed in order, in a plastic cup, using a two inch cowls impeller at 600 rpm with stirring while adding the dry powders. The letdown ingredients are mixed, in order, stirring during each addition and continuing stirring until the rheology modifier is fully dispersed. The grind is added to the letdown and stirred until uniform and smooth. Any additives, such as solvent or phosphate-containing polymers, were added to an aliquot of the original mixture and blended with a Flaktek speedmixer for three minutes at 2000 rpm. An exemplary recipe for a coating is listed in Table 1.

TABLE 1

| Grind | Weight % | Volume % |
|---|---|---|
| Water | 10.98 | 15.82 |
| Propylene glycol | 2.07 | 2.87 |
| Dispersant (Tamol 851) | 0.41 | 0.48 |
| Tetrasodium pyrophosphate | 0.12 | 0.20 |
| Defoamer (Foamaser NXZ) | 0.16 | 0.26 |
| Talc | 0.34 | 0.09 |
| Calcium carbonate (Snowhite 12) | 37.82 | 20.14 |
| Titanium dioxide (Ti-Pure R-706) | 5.97 | 2.15 |
| Letdown | | |
| Waterborne Polymer Dispersion (example Rhovene 6120) | 37.31 | 50.88 |
| Defoamer (Foamaser NXZ) | 0.16 | 0.26 |
| Coalescent (DPGME) | 0.59 | 0.90 |
| Base (Ammonia 33%) | 0.08 | 0.14 |
| Rheology modifier (Bermocoll E 481 FQ) | 0.34 | 0.56 |
| Water | 3.65 | 5.25 |

The waterborne polymer dispersion comprises a base polymer dispersed in a water-based carrier solvent. The base polymer of the coating composition may be an acrylate polymer. In some embodiments, the base polymer may be one of the polymers listed in Table 2. While these polymers are listed as examples, other polymers may be used in the composition. In some embodiments, the base polymer is a silicone.

It should be understood that the coating composition may comprise additional and/or different additives. Additionally, the amount of each ingredient may be different depending on the exact polymers, additives, and combinations. In some embodiments, the coating composition comprises nepheline syenite. In some embodiments, the coating composition comprises talc. In some embodiments, the coating composition comprises bentonite. In some embodiments, the coating composition comprises titanium dioxide. Additionally, or alternatively, the coating composition comprises calcium carbonate. Exemplary defoamer components include, but are not limited to: Rhodoline 681F, Foamaser NXZ, BYK-030, any mineral oil-based defoamer known in the art, and any silicone-based defoamer known in the art. Exemplary coalescent components include, but are not limited to: hydrocarbon solvents; water-soluble glycol ethers, such as PB (propylene glycol butyl ether), DPGME (dipropylene glycol methyl ether); TpiB (2,2,4-trimethyl-1,3-pentane diol mono-isobutyrate), and propylene glycol monoesters of C6-C10 aliphatic acids. Examples of rheology modifiers include but are not limited to: cellulosics such as hydroxyethylcellulose (Natrosol 250 MXR and Bermocell E 481 FQ), hydrophobically modified polyurethanes, hydrophobically modified polyethers, and inorganic-based such as clays, and silica.

In some embodiments, the coating composition comprises a phosphate additive, such as tetrapotassium pyrophosphate (TKPP), tetrasodium pyrophosphate (TSPP), or other small molecule phosphate additives. In some embodiments, the coating composition further comprises a phosphate additive that is a phosphate-containing polymer. In some embodiments, the phosphate-containing polymer comprises 2-(methacryloyloxy)ethyl phosphonic acid or MEP. Additionally, or alternatively, the phosphate-containing polymer comprises phosphoethyl methacrylate or PEM. In some embodiments, the phosphate-containing polymer comprises a polymer of Formula I, wherein R is an alkyl group.

(Formula I)

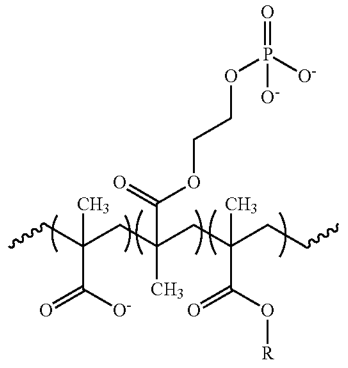

Coating MgO Boards

The MgO boards used were Dupont™ ArmorWall™ structural sheathing comprising a glass-fiber woven scrim-reinforced magnesium oxide-based (MgO) board having insulation attached to one surface. The opposite surface of the MgO boards was wiped clean of any dust followed by a drawdown of the coating on that board surface. A thin second coat is applied to fill any pinholes in the coating resulting from the rough MgO surface. The final dry film thickness with both layers ranges from 0.008 inches to 0.011 inches. After application of the coating, the coating is either dried for two weeks at 24° C./50% RH (typical field drying conditions) or at elevated temperatures for 24 hours followed by equilibration at 75° F./50% RH for one day. The coating may be cured at a temperature of about 30° C. to about 60° C. In some embodiments, the curing temperature is determined by the Tg of the polymer in the coating. In some embodiments, the curing temperature is greater than the Tg of the polymer. Curing, as used herein with reference to the coating composition, refers to the evaporation of solvent and film-forming of a polymer solution or dispersion.

The ideal water-resistant coating will meet the following criteria: adhere to the board surface in both wet and dry condition, resist typical construction site abuse, prevent liquid water from entering the board and building, minimally absorb water, prevent air from entering the building, resist mold growth, maintain performance after exposure to UV radiation, facilitate adhesion of joint treatment and flashing, and allow any water that reaches the inside of the board to dry out-water vapor permeability.

Characterization of Glass Transition Temperature (Tg) by Differential Scanning calorimetry (DSC)

After fully curing, or drying, a sample, it is heated at a rate of 10° C. per minute from −50° C. to 75° C. under nitrogen. The sample is then cooled at 10° C. per minute back down to −50° C. the sample is then heated a second time at 10° C. per minute from −50° C. to 75° C. and the glass transition temperature is measured during the second heating. The inflection point is used to designate the glass transition temperature. The glass transition temperatures of evaluated materials are listed in Table 2. The values reported in Table 2 are as reported from the manufacturer.

TABLE 2

| Sample | Trade Name Waterborne Polymer Dispersion | Chemistry | Tg (° C.) |
|---|---|---|---|
| Sample 1 | Rovene 6133 | Styrene acrylic | 10 |
| Sample 2 | Rovene 6018 | Silanated styrene acrylic | 27 |

TABLE 2-continued

| Sample | Trade Name Waterborne Polymer Dispersion | Chemistry | Tg (° C.) |
|---|---|---|---|
| Sample 3 | Ecronova 6607 | Styrene acrylic | 33 |
| Sample 4 | Ecranova 6608 | Acrylic | 23 |
| Sample 5 | Rovene 6034 | Styrene acrylic | 23 |
| Sample 6 | Rovene 6026 | Styrene acrylic | 20 |
| Sample 7 | Rovene 6119 | Styrene acrylic-phosphate | −24 |
| Sample 8 | Rovene 6120 | Acrylic | −26 |
| Sample 9 | Rhoplex 2620 | Acrylic | −26 |
| Sample 10 | Sycoat 2020 | Acrylic | 17 |
| Sample 11 | Sycoat 31 | Acrylic | 5 |
| Sample 12 | Sycoat 520 | Styrene acrylic | 40 |
| Sample 13 | Sycoat UC-404 | Styrene acrylic | 14 |
| Sample 14 | Performasil 100 | Silicone | <−50 |

Adhesion

The water-resistant coating described herein has desirable adhesive properties in both wet and dry conditions to the MgO board surface. Adhesion experiments were performed to evaluate the effect of specific formulation elements on adhesion to MgO boards in both wet and dry conditions. An ideal pull-off strength for the water-resistant coating tested in dry conditions is 100 psi or greater and is known as dry pull-off strength. An ideal pull-off strength for the water-resistant coating tested in wet conditions is 50 psi or greater and is known as wet pull-off strength. For convenience, the insulation layer was removed from the insulated MgO board prior to adhesion testing, as the insulation on the opposing side of the MgO board does not affect the adhesion between the film and the board or the pull-off strength of the coating on the board.

Dry pull-off adhesion was measured using ASTM D4541. Briefly, a loading fixture "puck" is adhered to the coating surface after applying and curing the coating on an MgO panel. 3M Scotchweld 2216 epoxy was used to adhere the puck to the coating. Dry pull-off adhesion was measured with a cross-head speed of 2" per minute, measuring the peak pull-off adhesive force. The data reported in FIG. 1 is the average of at least three samples.

Wet pull-off adhesion was measured using a modified ASTM D4541. Cured, coated substrates were first immersed in deionized water for 24 hours. After 24 hours, the saturated samples were removed from water, the surface of the WRB wiped dry, and the adhesion puck glued to the surface. The sample, with adhered puck, was partially immersed in water, avoiding direct contact of the epoxy in water. The wet pull-off adhesion testing was done as described above, measuring the peak pull-off adhesive force. The data reported in FIG. 1 is the average of at least three samples. Most of the data in FIG. 1 is further summarized in Table 3.

TABLE 3

| Type of Example | Sample | Trade Name Waterborne Polymer Dispersion | Tg (° C.) | With TSPP? | Dry Pull-Off (psi) | Wet Pull-Off (psi) |
|---|---|---|---|---|---|---|
| Inventive | 1 | Rovene 6133 | 10 | Yes | 140 | 84.3 |
| Comparative | 2 | Rovene 6018 | 27 | Yes | 148.1 | 45.1 |
| Inventive | 4 | Ecronova 6608 | 23 | Yes | 134.7 | 90.9 |
| Inventive | 5 | Rovene 6034 | 23 | Yes | 142.1 | 57.8 |
| Inventive | 9 | Rhoplex 2620 | 26 | Yes | | 108.3 |
| Inventive | 10 | Sycoat 2020 | 17 | Yes | 130.8 | 61 |
| Inventive | 11 | Sycoat 31 | 5 | Yes | 137.6 | 79 |
| Comparative | 12 | Sycoat 520 | 40 | Yes | 134.2 | 15.8 |
| Inventive | 1 | Rovene 6133 | 10 | No | 153 | 87.9 |
| Comparative | 2 | Rovene 6018 | 27 | No | 160.4 | 30.6 |

TABLE 3-continued

| Type of Example | Sample | Trade Name Waterborne Polymer Dispersion | Tg (° C.) | With TSPP? | Dry Pull-Off (psi) | Wet Pull-Off (psi) |
|---|---|---|---|---|---|---|
| Comparative | 4 | Ecronova 6608 | 23 | No | 127.7 | 46.5 |
| Comparative | 5 | Rovene 6034 | 23 | No | 161.9 | 33 |
| Inventive | 7 | Rovene 6119 | −24 | No | 169 | 108.4 |
| Inventive | 8 | Rovene 6120 | −26 | No | 170 | 93.6 |
| Inventive | 9 | Rhoplex 2620 | −26 | No | 159.5 | 133.9 |
| Inventive | 10 | Sycoat 2020 | 17 | No | 152.8 | 55.3 |
| Inventive | 11 | Sycoat 31 | 5 | No | 167.6 | 114.8 |
| Inventive | 14 | Performasil 100 | <−50 | No | 186.4 | 68.1 |

Based on the results shown in FIG. 1 and Table 3, it has been demonstrated that materials with a low glass transition temperature exhibit ideal adhesion to MgO boards in both dry and wet conditions. These coatings are found to fail cohesively versus interfacially, or adhesively, in the pull-off test. This means that the adhesion between the coating and the substrate exceeds the strength of the substrate itself. In some embodiments, the base polymer of the coating composition has a Tg less than 20° C. Additionally, or alternatively, the base polymer of the coating composition has a Tg less than 10° C. For inventive examples wherein the Tg is greater than 20° C., as is the case with Sample 4 and Sample 5, where the Tg is 23° C., when a phosphate additive, such as tetrapotassium pyrophosphate (TKPP) or tetrasodium pyrophosphate (TSPP), is added, the wet pull-off strength increases to within the desired range. The same improvement in pull-off strength, when applied in wet conditions, can be see with other phosphate additives, such as the phosphate-containing polymers described herein.

Other factors that may contribute to the ideal wet adhesion of the coating described herein are the use of a high-coalescing solvent in the coating composition, as well as the addition of a phosphate-containing polymer. In some embodiments, a base polymer having a low Tg is intended to include a polymer with the addition of a high-coalescing solvents, which are known in the art to artificially lower the Tg.

In some embodiments, the coating composition disclosed herein may have a pull-off strength of 50 psi or greater when tested under wet conditions (i.e., wet pull-off adhesion strength). In some embodiments, the coating composition disclosed herein may have a pull-off strength of 60 psi or greater when tested under wet conditions (i.e., wet pull-off adhesion strength). In some embodiments, the coating composition disclosed herein may have a pull-off strength of 80 psi or greater when tested under in wet conditions (i.e., wet pull-off adhesion strength). In some embodiments, the coating composition can have a pull-off strength of 80 psi or greater when tested under in dry conditions (i.e., dry pull-off adhesion strength). In some embodiments, the coating composition may have a pull-off strength of 100 psi or greater tested under dry conditions (i.e., dry pull-off adhesion strength). In some embodiments, the coating composition may have a pull-off strength of 120 psi or greater when tested under dry conditions (i.e., dry pull-off adhesion strength).

Vapor Permeability

Figure 2:
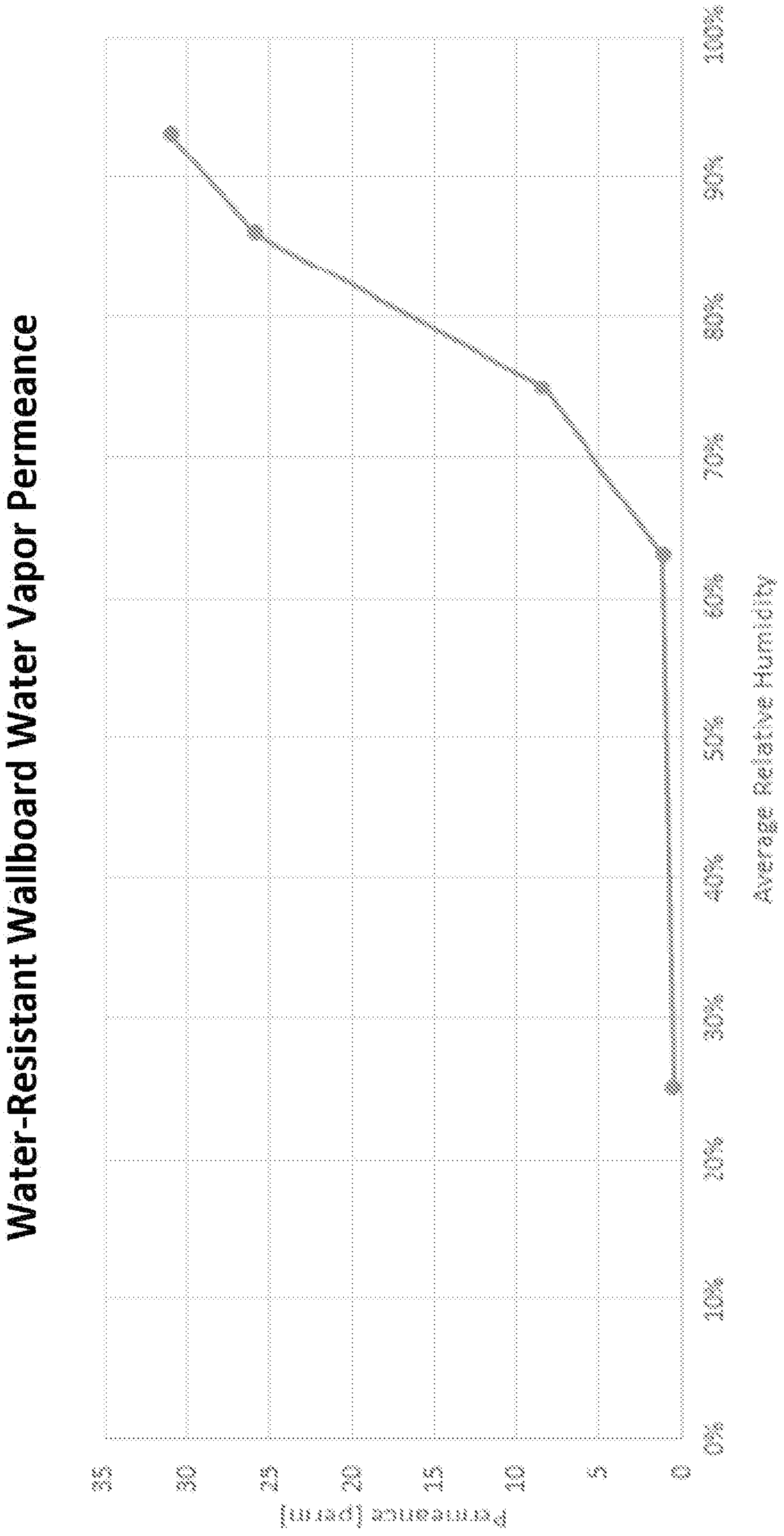
FIG. 2 is a chart representing the variable water vapor permeability of the water-resistant wallboard, in accordance with an embodiment of the present invention.

The water-resistant coatings described herein have a variable vapor permeability. Standard Test Methods for Water Vapor Transmission of Materials, according to ASTM E96/E96M-22, were run on the coated wallboard described herein. The tests were run using both the water method and the desiccant method. Additionally, three other average relative humidity values were conducted for the air barrier to cover the dependency of permeance on the average relative humidity. Salt solutions were used to control the relative humidity for these additional measurements. FIG. 2 depicts the dependency of the water vapor permeance on the average relative humidity for the coated wallboard described herein. The water vapor permeance increases as the relative humidity increases.

Face Column

Water columns were formed with 0.22 inch acrylic sheets (18 inch by 24 inch) sealed to panel specimen (24 inch by 28 inch). The acrylic sheet and panel were held off from the WRB panel with 0.16 inch spaces but otherwise sealed at the base and sides using a silicone sealant. The sealant was allowed to cure for a minimum of seven days. After which, dyed water was filled into the column space and maintained at a water height of 21.6 inches for the duration of the experiment. After thirty days, the samples were examined. The WRB panels comprising the water-resistant coating as described herein passed the inspection. A sample passes the inspection if, when examined, there is no staining of the panel with the dye from the water on either the front side of the panel, the back side of the panel, or within a cross-section of the panel, indicating that the panel is water-resistant for at least the duration of the experiment. The water-resistant wallboard described herein is shown to resist water for at least thirty days.

While the materials and methods of the present disclosure were described with reference to a number of embodiments, it will be understood by one of ordinary skill in the art that the present invention is not limited to the disclosed embodiments. Rather, the invention may be modified to incorporate any number of variations, alterations, and substations not described herein but that are commensurate with the scope of the invention.

What is claimed is:

1. A water-resistant wall panel comprising:

a composite cementitious layer having a first surface and a second surface, and a water-resistant coating on the first surface of the composite cementitious layer, wherein the water-resistant coating is formed from a water-resistant coating composition, the water-resistant coating composition comprising a base polymer and at least 20 weight percent water wherein the base polymer has a glass transition temperature of less than 20° C.; and optionally, an insulating layer attached to the second surface of the composite cementitious layer.

2. The water-resistant wall panel of claim 1, wherein the water-resistant coating of the water-resistant wall panel has a pull-off adhesion strength of 50 psi or greater, when the water-resistant wall panel is tested in wet conditions.

3. The water-resistant wall panel of claim 1, wherein the composite cementitious layer comprises magnesium oxide and glass fiber reinforcing material.

4. The water-resistant wall panel of claim 1, wherein vapor permeability, determined in accordance with ASTM E96/E96M-22, of the wall panel increases in a humid environment.

5. The water-resistant wall panel of claim 1, wherein the base polymer of the water-resistant coating has a glass transition temperature less than 10° C.

6. The water-resistant wall panel of claim 1, wherein the base polymer of the water-resistant coating comprises an acrylate, styrene, or silicone monomer.

7. The water-resistant wall panel of claim 1, wherein the water-resistant coating further comprises a phosphate additive.

8. The water-resistant wall panel of claim 7, wherein the phosphate additive is tetrasodium pyrophosphate (TSPP), tetrapotassium pyrophosphate (TKPP), 2-(methacryloyloxy) ethyl phosphonic acid (MEP), phosphoethyl methacrylate (PEM), or a polymer of Formula I, wherein R is an alkyl group.

(Formula I)

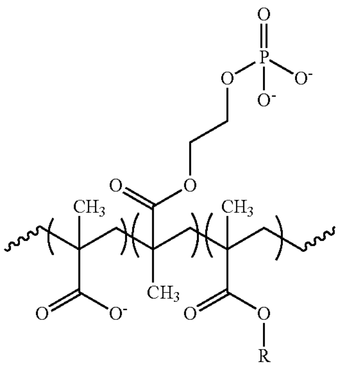

9. The water-resistant wall panel of claim 1, wherein the insulating layer is present, and the water-resistant coating has a greater vapor permeability than the insulating layer, as determined in accordance with ASTM E96/E96M-22.

10. A water-resistant wall panel comprising: a composite cementitious layer having a first surface and a second surface, and a water-resistant coating on the first surface of the composite cementitious layer, wherein the water-resistant coating is formed from a water-resistant coating composition, the water-resistant coating composition comprising a base polymer, at least 20 weight percent water, and a phosphate additive, wherein the base polymer has a glass transition temperature of 23° C. or less, and optionally, an insulating layer attached to the second surface of the composite cementitious layer.

11. The water-resistant wall panel of claim 10, wherein the water-resistant coating of the water-resistant wall panel has a pull-off adhesion strength of 50 psi or greater, when the water-resistant wall panel is tested in wet conditions.

12. The water-resistant wall panel of claim 10, wherein the composite cementitious layer comprises magnesium oxide and glass fiber reinforcing material.

13. The water-resistant wall panel of claim 10, wherein vapor permeability, determined in accordance with ASTM E96/E96M-22, of the wall panel increases in a humid environment.

14. The water-resistant wall panel of claim 10, wherein the base polymer has a glass transition temperature of less than 20° C.

15. The water-resistant wall panel of claim 14, wherein the base polymer of the water-resistant coating has a glass transition temperature less than 10° C.

16. The water-resistant wall panel of claim 10, wherein the base polymer of the water-resistant coating comprises an acrylate, styrene, or silicone monomer.

17. The water-resistant wall panel of claim 10, wherein the phosphate additive is tetrasodium pyrophosphate (TSPP), tetrapotassium pyrophosphate (TKPP), 2-(methacryloyloxy)ethyl phosphonic acid (MEP), phosphoethyl methacrylate (PEM), or a polymer of Formula I, wherein R is an alkyl group.

(Formula I)

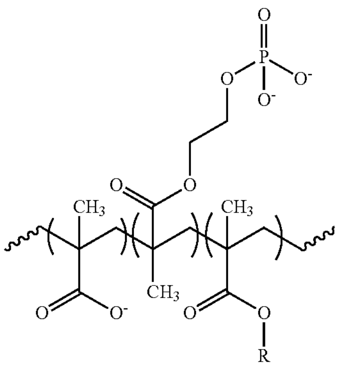

18. The water-resistant wall panel of claim 10, wherein the insulating layer is present, and the water-resistant coating has a greater vapor permeability than the insulating layer, as determined in accordance with ASTM E96/E96M-22.

19. A water-resistant wall panel, consisting essentially of:

a composite cementitious layer having a first surface and a second surface, and a water-resistant coating on the first surface of the composite cementitious layer, wherein the water-resistant coating is formed from a water-resistant coating composition, the water-resistant coating composition consisting essentially of a base polymer, a phosphate additive, and at least 20 weight percent water, wherein the base polymer has a glass transition temperature of less than 20° C.; and optionally, an insulating layer attached to the second surface of the composite cementitious layer.

20. The water-resistant wall panel of claim 1, wherein the water-resistant coating has a thickness of 0.008 inches to 0.011 inches across the first surface of the composite cementitious layer.

* * * * *